United States Patent
O'Regan et al.

(10) Patent No.: US 10,404,475 B2
(45) Date of Patent: Sep. 3, 2019

(54) METHOD AND SYSTEM FOR ESTABLISHING A SECURE COMMUNICATION TUNNEL

(71) Applicant: VISA INTERNATIONAL SERVICE ASSOCIATION, San Francisco, CA (US)

(72) Inventors: Alan Joseph O'Regan, Constantia (ZA); Horatio Huxham, Kenridge (ZA)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 65 days.

(21) Appl. No.: 15/525,896

(22) PCT Filed: Jan. 22, 2016

(86) PCT No.: PCT/IB2016/050313
§ 371 (c)(1),
(2) Date: May 10, 2017

(87) PCT Pub. No.: WO2016/116890
PCT Pub. Date: Jul. 28, 2016

(65) Prior Publication Data
US 2017/0338964 A1    Nov. 23, 2017

(30) Foreign Application Priority Data

Jan. 22, 2015 (ZA) .................................. 2015/00446

(51) Int. Cl.
*H04L 9/32* (2006.01)
*H04L 29/06* (2006.01)
(Continued)

(52) U.S. Cl.
CPC .......... *H04L 9/3263* (2013.01); *H04L 9/0861* (2013.01); *H04L 9/14* (2013.01);
(Continued)

(58) Field of Classification Search
CPC ..... H04L 9/3263; H04L 12/4633; H04L 9/14; H04L 9/0861; H04L 67/141; H04L 9/30;
(Continued)

(56) References Cited

U.S. PATENT DOCUMENTS 6,317,831 B1 * 11/2001 King .................. H04L 63/0428
380/223
7,382,882 B1 * 6/2008 Immonen ............ H04L 63/0428
380/247

(Continued)

FOREIGN PATENT DOCUMENTS

EP      0989712 A2     3/2000

OTHER PUBLICATIONS

Supplementary European Search Report, dated Aug. 7, 2018, in European Patent Application No. 16739865.0, 10 pages.
(Continued)

*Primary Examiner* — Matthew Smithers
(74) *Attorney, Agent, or Firm* — Kilpatrick Townsend & Stockton LLP (57) ABSTRACT

A computer-implemented method for establishing a secure communication tunnel between a device and a server is provided. The method comprises the server receiving a session request from the device to establish a secure tunnel. A handshake procedure is carried out to set up an encryption/decryption key for the secure tunnel. The handshake procedure uses a first communication channel from the server to the device. The method also includes sending a component of the handshake procedure to the device via a second communication channel. This component is required by the device to continue the handshake procedure or to commencing use of the secure tunnel established by the handshake procedure.

21 Claims, 8 Drawing Sheets

(51) Int. Cl.
    *H04L 9/08*            (2006.01)
    *H04L 9/14*            (2006.01)
    *H04L 9/30*            (2006.01)
    *H04L 12/46*           (2006.01)
    *H04L 29/08*           (2006.01)

(52) U.S. Cl.
    CPC .............. *H04L 9/30* (2013.01); *H04L 12/4633* (2013.01); *H04L 29/06* (2013.01); *H04L 63/061* (2013.01); *H04L 63/18* (2013.01); *H04L 67/141* (2013.01); *H04L 63/166* (2013.01); *H04L 69/14* (2013.01); *H04L 2463/061* (2013.01)

(58) Field of Classification Search
    CPC ....... H04L 63/061; H04L 63/18; H04L 29/06; H04L 2463/061; H04L 63/166; H04L 69/14
    See application file for complete search history.

(56) References Cited

U.S. PATENT DOCUMENTS

| | | | | |
|---|---|---|---|---|
| 9,306,913 | B1* | 4/2016 | Volkov | H04L 63/0272 |
| 9,419,942 | B1* | 8/2016 | Buruganahalli | H04L 12/4633 |
| 9,930,067 | B1* | 3/2018 | Johansson | H04L 63/166 |
| 2004/0053601 | A1* | 3/2004 | Frank | G01S 5/0252 |
| | | | | 455/411 |
| 2006/0059344 | A1* | 3/2006 | Mononen | H04L 63/061 |
| | | | | 713/171 |
| 2008/0056507 | A1* | 3/2008 | Logvinov | H04B 3/54 |
| | | | | 381/77 |
| 2008/0215883 | A1* | 9/2008 | Fok | H04L 63/0869 |
| | | | | 713/167 |
| 2009/0089863 | A1* | 4/2009 | Vanniarajan | H04L 63/0272 |
| | | | | 726/5 |
| 2010/0299525 | A1* | 11/2010 | Shah | H04L 63/0428 |
| | | | | 713/171 |
| 2011/0211700 | A1* | 9/2011 | Park | H04L 63/061 |
| | | | | 380/282 |
| 2011/0270751 | A1 | 11/2011 | Csinger et al. | |
| 2012/0124375 | A1* | 5/2012 | Truskovsky | H04L 9/3263 |
| | | | | 713/168 |
| 2013/0067552 | A1* | 3/2013 | Hawkes | H04L 63/166 |
| | | | | 726/7 |
| 2013/0156189 | A1 | 6/2013 | Gero et al. | |
| 2014/0223175 | A1 | 8/2014 | Bhatnagar | |
| 2014/0289826 | A1* | 9/2014 | Croome | H04L 67/141 |
| | | | | 726/5 |
| 2015/0106624 | A1* | 4/2015 | Gero | H04L 9/0643 |
| | | | | 713/171 |
| 2015/0128243 | A1* | 5/2015 | Roux | H04L 9/0877 |
| | | | | 726/9 |
| 2016/0119287 | A1* | 4/2016 | Khazan | H04L 63/166 |
| | | | | 726/12 |
| 2016/0277372 | A1* | 9/2016 | Shah | H04L 63/061 |
| 2018/0262530 | A1* | 9/2018 | Sharifi Mehr | H04L 63/166 |

OTHER PUBLICATIONS

International Search Report and Written Opinion, dated May 23, 2016, in PCT Application No. PCT/IB2016/050313, 12 pages.

* cited by examiner

METHOD AND SYSTEM FOR ESTABLISHING A SECURE COMMUNICATION TUNNEL

CROSS REFERENCE TO RELATED APPLICATIONS

This application is a National Stage of International Application No. PCT/IB2016/050313 filed Jan. 22, 2016, and which claims the benefit of South African provisional patent application number 2015/00446 dated 22 Jan. 2015, which are all herein incorporated by reference in their entirety for all purposes.

FIELD OF THE INVENTION

This invention relates to a method and system for establishing a secure communications channel between a client device and a server.

BACKGROUND TO THE INVENTION

Session highjacking is the exploitation of a valid computer session in order to gain unauthorized access to information or services available on a computer system. It refers to the interception of a session identifier ("session ID") used to authenticate a user to a remotely located server.

A session ID is a data string used in network communication to identify a session, which is a series of related messages exchanged between two parties. A secure session is often required between parties for communication that needs to be secure. To achieve a secure session, the parties may employ a cryptographic protocol such as transport layer security (TLS) or secure sockets layer (SSL). Such sessions require the use of a handshake procedure during which the two communicating parties are identified, and at least an encryption key is agreed upon. A session ID is also selected or calculated. With these cryptographic protocols, the session ID is used to avoid unnecessary handshakes on new connections, in order to simplify communication between the parties. A session ID also identifies encryption and decryption keys used by the parties. The parties may often be a browser operated by a user and a remote server. A session ID is typically provided to the browser upon login to a website hosted by the server. Once logged in, the session ID is included in subsequent messages sent during the session. This identifies the browser to the server during the session. If an unscrupulous party obtains the session ID, that party can purport to be the user as messages transmitted to the server and including the valid session ID may be accepted by the server as being from the true user. The unscrupulous party may then be provided with access to privileged information of the user, or may even be allowed transact whilst purporting to be the user. The encryption and decryption keys used by the parties may also be visible to the unscrupulous party, further simplifying communication to them.

Attempts have been made to curb session highjacking, including by data encryption, lengthened session identifiers, session key regeneration after login, dynamic session identifiers that change after each request sent to the web server, and the like. According to the applicant's knowledge, these attempts have been only partially successful.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention there is provided a computer-implemented method for establishing a secure communication tunnel between a device and a server, the method carried out at the server having a processor and a memory configured to provide instructions to the processor and comprising:
  receiving a session request from the device to establish a secure tunnel;
  carrying out a handshake procedure to set up an encryption/decryption key for the secure tunnel wherein the handshake procedure uses a first communication channel from the server to the device;
  sending a component of the handshake procedure to the device via a second communication channel; and
  wherein continuing the handshake procedure or commencing use of the secure tunnel established by the handshake procedure requires use of the sent component by the device.

A further feature provides for the method to include looking up an address or identifier relating to the second communication channel of the device prior to sending the component of the handshake procedure via the second channel.

Still further features provide for the sent component to be a component required for the handshake procedure and continuing the handshake procedure to require use of the sent component by the device to generate a premaster key or the encryption/decryption key for the secure tunnel.

Yet further features provide for the sent component to be one of the group of: a version of the communication protocol used; a cipher version; a set of random data used for a session encryption key; a public key of the server; and a certificate of the server.

Further features provide for the sent component to be a component required for a session using the secure tunnel and commencing use of the secure tunnel to require use of the sent component by the device to start or recommence a session with the server.

A still further features provides for the sent component to be a session identifier which references the session parameters at the server.

Yet further features provide for the method to include, in response to detecting receipt of a session identifier from a different socket, sending a new component of the handshake procedure to the device via the second communication channel; and carrying out a new handshake procedure or commencing use of the session using the sent component.

Further features provide for the new component for commencing use of the session to be a new set of random numbers for generating a new session encryption/decryption key for the secure tunnel under the existing handshake.

A still further feature provides for the sent component to be encrypted with an encryption key.

Yet further features provide for the first communication channel to be a data channel using Transport Layer Security (TLS) or Secure Sockets Layer (SSL) protocol, and for the second channel to be one or the group of: a Short Message Service channel, Unstructured Supplementary Service Data (USSD) channel, an email channel, or another form of communication channel independent of the TLS or SSL channel.

The invention extends to a computer-implemented method for establishing a secure communication tunnel between a device and a server, wherein the method is carried out at the device having a processor and a memory configured to provide instructions to the processor and the method comprises:

sending a session request to the server to establish a secure tunnel;

carrying out a handshake procedure to set up an encryption/decryption key for the secure tunnel wherein the handshake procedure uses a first communication channel from the server to the device;

receiving a component of the handshake procedure via a second communication channel; and automatically detecting the receipt of the component at the second communication channel and using this component to continue the handshake procedure or to commence use of the secure tunnel established by the handshake procedure.

Further features provide for the sent component to be a component required for the handshake procedure and continuing the handshake procedure includes:

using the sent component to generate a premaster key or the encryption/decryption key for the secure tunnel.

Still further features provide for the sent component to be a component required for a session using the secure tunnel and commencing use of the secure tunnel includes:

providing the sent component to the server to start or recommence a session with the server.

Yet further features provide for the method to include, in response to using a session identifier from a different socket, receiving a new component of the handshake procedure via the second communication channel; and carrying out a new handshake procedure or commencing use of the session using the new component.

A further feature provides for the new component for commencing use of the session to be a new set of random numbers for generating a new session encryption/decryption key for the secure tunnel under the existing handshake.

Still further features provide for the sent component to be encrypted with an encryption key, and for the method to include:

decrypting the sent component using a decryption key provided by the server during the handshake procedure or at a registration process.

The invention extends to a system for establishing a secure communication tunnel comprising a server having a processor and a memory configured to provide instructions to the processor for carrying out the functions of server components, the server including:

a handshake initiating component for initiating a handshake procedure with a device in response to receiving a session request from the device;

a handshake component for carrying out a handshake procedure to set up an encryption/decryption key for the secure tunnel wherein the handshake procedure uses a first communication channel component from the server to the device;

a component sending module for transmitting a component of the handshake procedure to the device via a second communication channel component; and wherein continuing the handshake procedure or commencing use of the secure tunnel established by the handshake procedure requires use of the sent component by the device.

Further features provide for the system to include a second channel identifier lookup component for, in response to receiving a session request over the first communication channel component, looking up an identifier or address associated with the device.

A still further feature provides for the system to include a different socket detecting component for detecting when a valid session identifier is received via a different socket.

The invention extends to a system for establishing a secure communication tunnel comprising a device having a processor and a memory configured to provide instructions to the processor for carrying out the functions of device components, the device including:

a handshake initiating component for initiating a handshake procedure with a server by transmitting a session request to the server to establish a secure tunnel;

a handshake component for carrying out a handshake procedure to set up an encryption/decryption key for the secure tunnel wherein the handshake procedure uses a first communication channel from the server to the device;

an automatic detection component for automatically detecting a component of the handshake procedure received via a second communication channel component; and a handshake finalizing component for finalizing the handshake procedure using the component of the handshake procedure received via the second communication channel component or a session commencing component for commencing use of the secure tunnel established by the handshake procedure using the component of the handshake procedure received via the second communication channel.

A further feature provides for the handshake finalizing component uses the component to generate a premaster key or the encryption/decryption key for the secure tunnel.

A still further feature provides for the session commencing component to provide the component to the server to start or recommence a session with the server.

Yet further features provide for the system to include a session recommencing component for receiving a new component of the handshake procedure via the second communication channel; and for carrying out a new handshake procedure or commencing use of the session using the new component.

A further feature provides for the system to include a decrypting component for decrypting the component using a decryption key provided by the server during the handshake procedure or at a registration process.

The invention extends to a computer program product for establishing a secure communication tunnel, the computer program product comprising a non-transitory computer-readable medium having stored computer-readable program code, the computer-readable program code executable by a processing circuit to perform the steps of:

receiving a session request from the device to establish a secure tunnel;

carrying out a handshake procedure to set up an encryption/decryption key for the secure tunnel wherein the handshake procedure uses a first communication channel from the server to the device;

sending a component of the handshake procedure to the device via a second communication channel; and wherein continuing the handshake procedure or commencing use of the secure tunnel established by the handshake procedure requires use of the sent component by the device.

The invention also extends to a computer program product for establishing a secure communication tunnel, the computer program product comprising a non-transitory computer-readable medium having stored computer-readable program code, the computer-readable program code executable by a processing circuit to perform the steps of:

sending a session request to the server to establish a secure tunnel;

carrying out a handshake procedure to set up an encryption/decryption key for the secure tunnel wherein the handshake procedure uses a first communication channel from the server to the device;

receiving a component of the handshake procedure via a second communication channel; and automatically detecting the receipt of the component at the second communication channel and using this component to continue the handshake procedure or to commence use of the secure tunnel established by the handshake procedure.

BRIEF DESCRIPTION OF THE DRAWINGS

The invention will now be described, by way of example only, with reference to the accompanying representations in which.

DETAILED DESCRIPTION WITH REFERENCE TO THE DRAWINGS

Figure 1A:
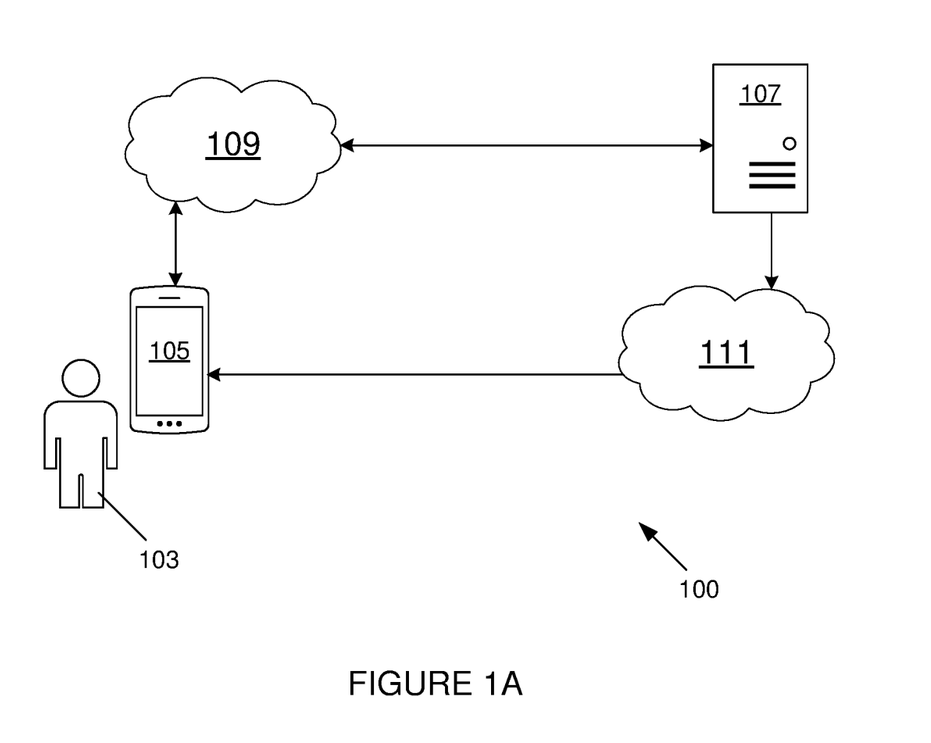
FIG. 1A is a schematic diagram of a system for establishing a secure communication tunnel according to an embodiment of the invention.

FIG. 1A illustrates an example embodiment of a system (100) for establishing a secure communication channel according to embodiments of the invention. The system includes a communication device (105) of a user (103), in the present embodiment a mobile communication device is shown, and a remote server (107). It should be noted that any type of communication device may be used. For example, a mobile phone, a tablet, a personal digital assistant, a phablet, a laptop computer, a personal computer or the like may be used. The communication device may be a mobile device or may be of fixed position, the communication device having at least two distinct forms of communication channel available for use.

A secure tunnel is defined as being a communication channel for secure transport of data traffic. Several protocols exist which allow a tunnel to be set up between two communicating devices. Communication over the tunnel may be encrypted in order to provide a secure communications session. A secure tunnel may allow a network user to access or provide a network service that the underlying network does not support, or does not provide directly. Secure tunnels may be used to transport another network protocol by encapsulation of its packets. Although the term "secure tunnel" is used herein, this should be broadly interpreted as being any secure communication arrangement which is set up using a handshake between a server and a device enabling secure sessions between the server and the device.

The server (107) and communication device (105) are able to communicate with one another over at least two communication channels (109, 111). Whatever device is used, the server should be able to communicate with it over at least two communication channels. In the present embodiment, the first communication channel (109) is the Internet, and the second communication channel is a Short Message Service (SMS) communication channel (111). However, it is possible that the communication channels may be any other channels. For example, the second communication channel may be an unstructured supplementary service data (USSD) communication channel, a multimedia message (MMS) communication channel, an email channel, or the like. It is important that the second communication channel is independent from the first communication channel. The first communication channel may be a Transport Layer Security (TLS) or Secure Sockets Layer (SSL) channel.

The first communication channel (109) may be used for establishing a secure session between the communication device (105) and the server (107). The secure session may use a cryptographic protocol such as transport layer security (TLS) or secure sockets layer (SSL). In the described methods and systems, an essential component of the secure session is sent via the second communication channel (111). The essential component may be a key piece of data required by the secure session or required in establishing the secure session. The secure session establishment may not be completed or a session may not be recommenced without the essential component thereby providing added security to the session.

As an essential component is not sent via the first communication channel (109), the secure session cannot be established or used without the receipt of the essential component via the second communication channel (111).

The second communication channel (111) may be a channel with a recorded or registered identifier or address for the device which is maintained at the server or able to be accessed by the server. Therefore, sending an essential component of the secure session to a registered identifier or address provides increased verification of the identity of the session requestor.

Figure 1B:
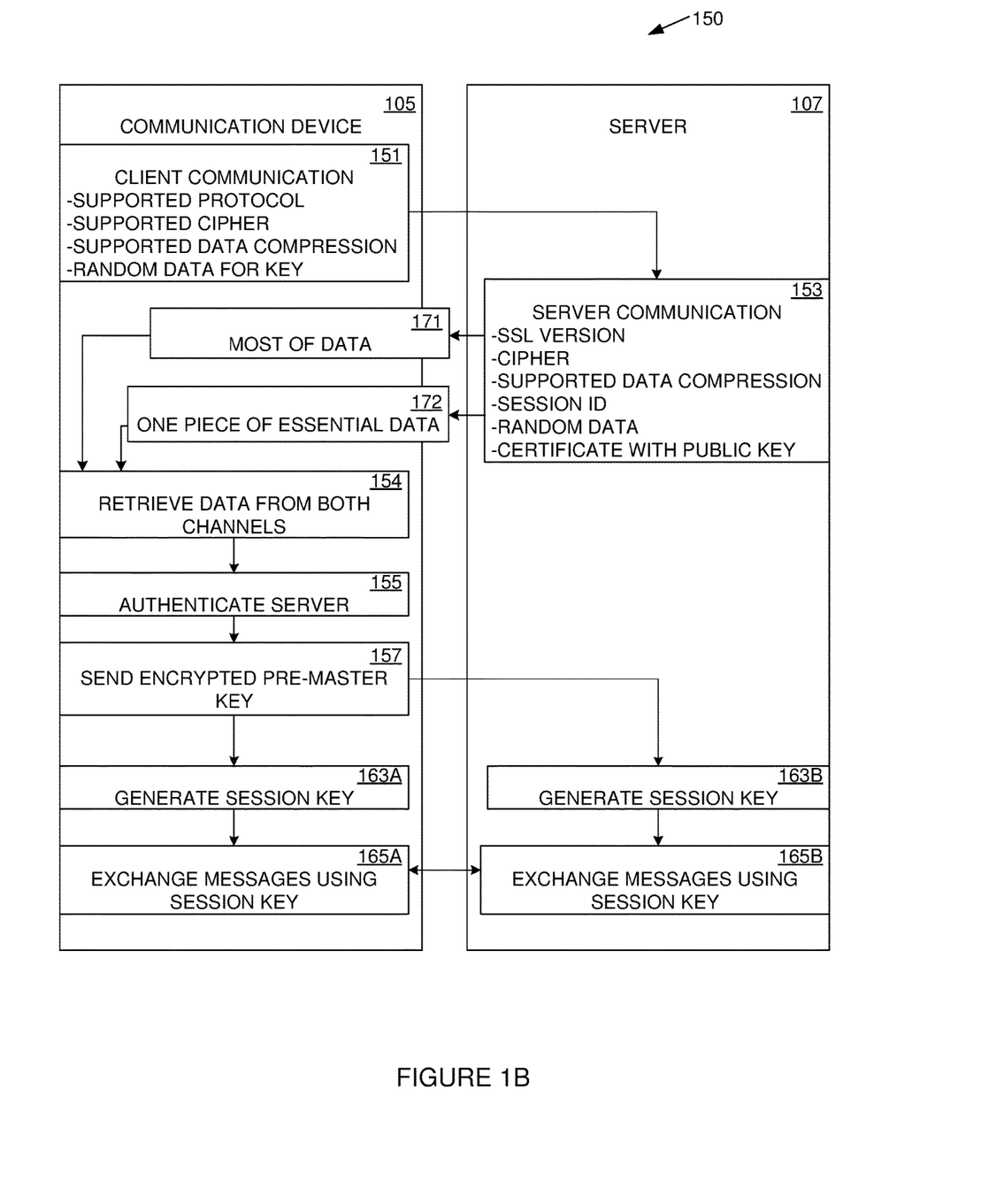
FIG. 1B is a schematic diagram illustrating communication in a handshake procedure using the system of FIG. 1A.

FIG. 1B shows a diagram (150) illustrating an example embodiment of a handshake procedure as carried out to provide a secure tunnel for secure sessions. A communication device (105) may initiate (151) communication via an initial message which constitutes a session request. This may be sent over the first communication channel (109). The session request initiates a handshake procedure between the device and the server. This initial message typically includes the supported protocol, cipher and data compression, as well as randomly generated data for an encryption key.

The server responds (153) with a return communication, which typically includes the server's communication protocol version, cipher version, supported data compression, session identifier (Session ID), random data used for a session encryption key, and the server's digital certificate with its public key. If the client is requesting a server resource that requires client authentication, the server also requests the client's digital certificate. The session identifier serves as an identifier for the current interactive session by referencing the parameters of the session at the server. Most of these components (171) may be sent via the first communication channel (109). However, any one or more of these components (172) may be sent via the second communication channel (111). The components (172) sent via the second communication channel may be encrypted before being transmitted.

Without having all of the required components, the handshake procedure cannot be successfully completed or the secure tunnel cannot be used. As an example, the server public key is required to complete the handshake procedure, and an absence thereof will not allow a successful handshake procedure. Furthermore, the session ID is required for communication between the device and the server after the handshake procedure. Without it, a session cannot be continued, and reconnection will not be possible. As a result, access to the second communications channel will be required in order to complete the handshake procedure or to continue with a communications session, depending on the component sent over this channel. This may reduce the risk of an unscrupulous party purporting to communicate as the authorised device.

The component sent via the second communication channel may be required by the device to generate a premaster key or the encryption/decryption key for the secure tunnel. Furthermore, the component may be required for a session using the secure tunnel, and commencing use of the secure tunnel may require use of the sent component to start or to recommence a session with the server. The component may be a session identifier which references the session parameters at the server.

The communication device (105) receives (154) the components of the server communication (153) via the first and second communication channels.

In some embodiments, the component received via the second communication channel may be encrypted, and it will need to be decrypted by the device before use thereof. The encryption may use the server's public key (if this is not used as the component sent via the second communication channel), or a separate key provided by the server, for example during the server communication (153) or during a registration process with the device at which the second communication channel identification is provided.

The device authenticates (155) the server using the available information, and creates a premaster secret for the session, encrypts it with the server's public key available from the server's digital certificate, and sends (157) the encrypted premaster secret to the server.

If required, the communication device (105) may also send its digital certificate to the server in order for the server to authenticate the device using the available information.

Both the communication device and the server then use the premaster secret to generate (163A, 163B) session keys which are symmetric keys used to encrypt and decrypt information exchanged during the tunnel session, and to verify its integrity. The handshake procedure may then be considered complete and the communication device (105) and server (107) may exchange (165A, 165B) messages using the session key.

Figure 2A:
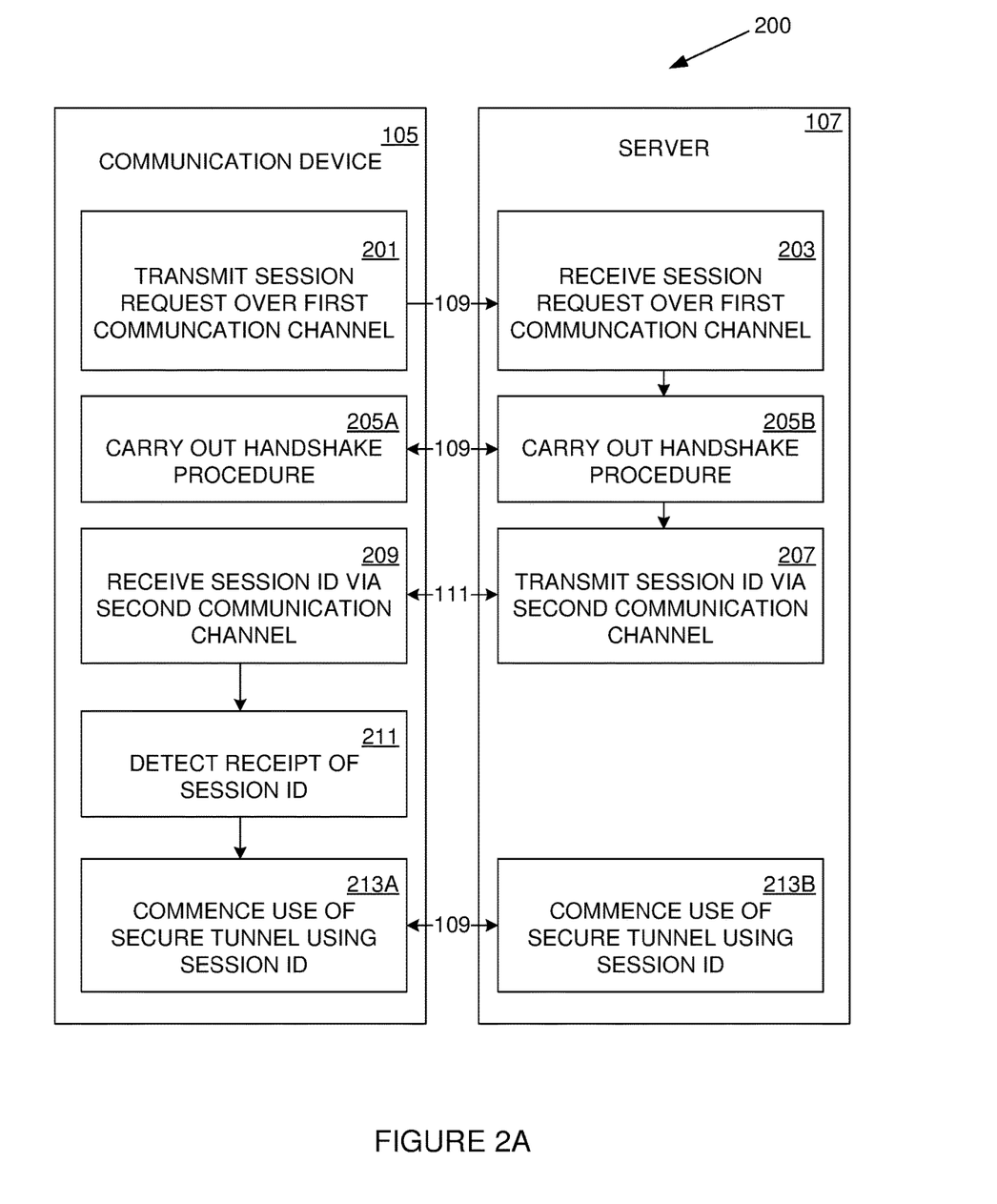
FIG. 2A is a swim lane flow diagram illustrating a method for establishing a secure communication channel between a server and a device according to an embodiment of the invention.
Figure 2B:
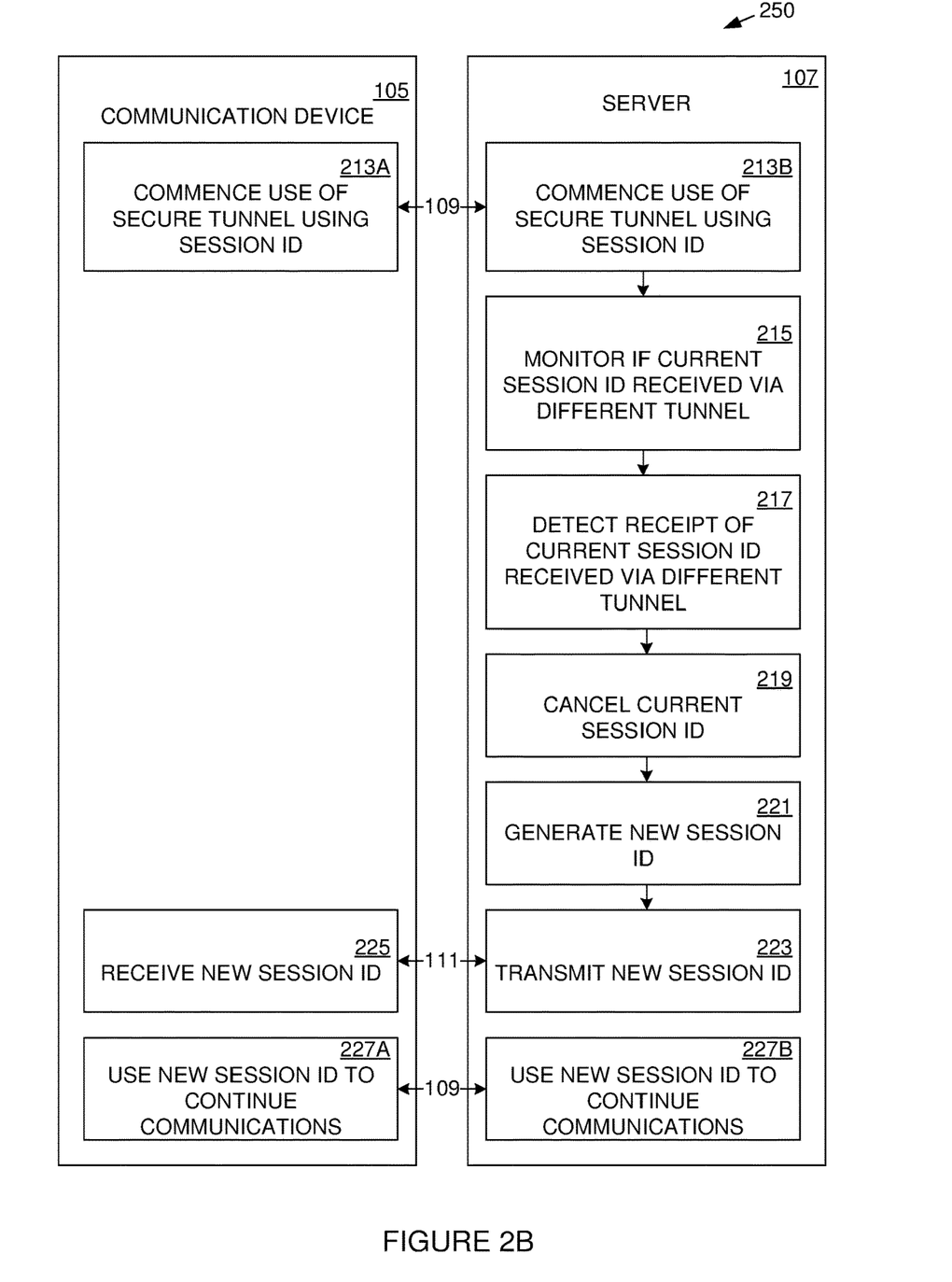
FIG. 2B is a swim lane flow diagram illustrating a method between a server and a device in accordance with an embodiment of an aspect of the invention.
Figure 3:
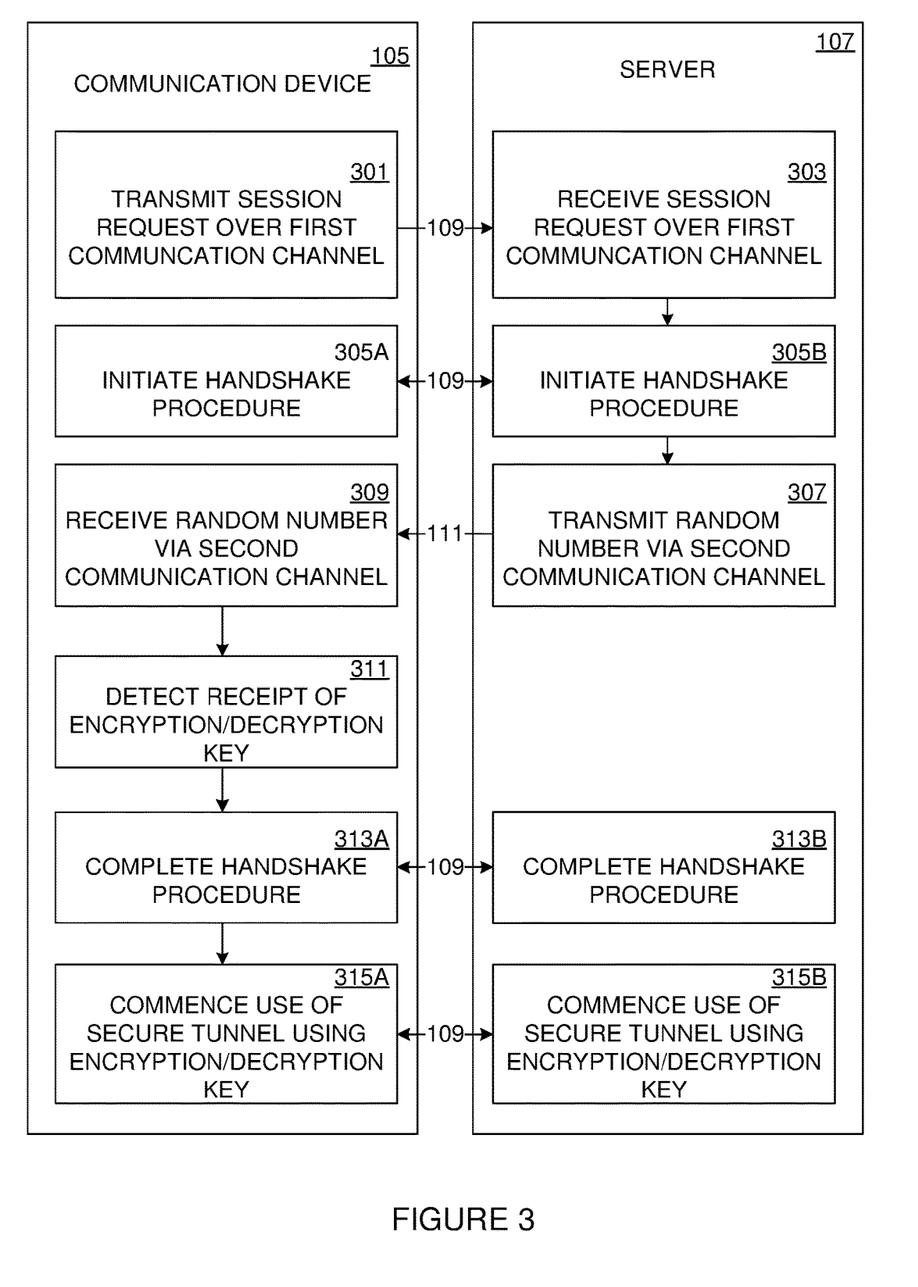
FIG. 3 is a swim lane flow diagram illustrating a method for establishing a secure communication channel between a server and a device according to another embodiment of the invention.

Example embodiments of the method are described and illustrated by the embodiments of the swim lane diagram (200) of FIG. 2A, the swim lane diagram (250) of FIG. 2B, and the swim lane diagram (300) of FIG. 3.

Referring to FIG. 2A, a first embodiment of the described method is illustrated. When the communication device (105) needs to securely communicate with the server (107), it transmits (201) a session request to the server over the first communication channel, the Internet (109).

The server (107) receives (203) the session request and carries out (205A, 205B) a handshaking procedure which in this embodiment is a secure sockets layer (SSL) handshake.

A secure tunnel is then created between the communication device (105) and the server (107). During the handshake, the server and the communication device agree on a cipher specification and a key used to encrypt and decrypt information. It should be noted that the handshake is performed whilst making use of both the first and the second communication channels. In the embodiment described with reference to FIG. 1B, it is shown that the majority of data communication may occur over the first communication channel, typically the Internet. Only some essential part of data need to be transmitted over the second communication channel to enable the handshake procedure to be completed.

The server transmits (207) a component of the handshake procedure via the second communication channel (111), for example, in the case of a mobile communication device, an SMS communication channel, or in the case of a fixed computer, an email channel.

In some embodiments, the server has a database associated therewith which includes addresses or identifiers associated with various devices authorised for use of the system and which are required to communicate with the device over the second communication channel. By identifying the device over the first communication channel, the server may look up the identifier or address in the database. This may then be used to contact the device over the second communication channel. In an alternative embodiment, the device may transmit an identifier of the second communication channel to the server. Such a transmitted identifier may be encrypted with the public key received from the server.

In the present embodiment, the component sent via the second communication channel is the session ID which references parameters of the agreed handshake and is required in any subsequent communication using the secure channel. It should be noted that the session ID may be encrypted to increase security of the transfer thereof.

The session ID is received (209) by the mobile communication device over the second communication channel (111). The communication device (105) may automatically scan the second communication channel (111) to detect (211) the session ID, possibly via an application operating on the communication device. In the case of the second communication channel being an SMS channel and the communication device being a mobile communication device, the mobile communication device may intercept the SMS communication and forward this to the handshake procedure on the data channel of the mobile communication device. Similarly, a fixed computer may intercept a communication on an email channel.

Once the session ID is detected, the communication device is able to commence use (213) of the session ID in data transmitted to the server in the current session, via the secure tunnel, over the first communication channel (109).

By transmitting the session ID over a second communication channel, the possibility of an unscrupulous party intercepting the session ID may be reduced, possibly reducing the risk of session highjacking.

FIG. 2B shows an embodiment of an additional aspect of the method where the server is configured to detect when a session ID created for use over a first secure tunnel is received via a different tunnel or socket. A swim lane flow diagram (250) shows the method of operation of this embodiment.

After use of the secure tunnel with the encryption/decryption key has commenced (213A, 213B), the server monitors (215) when a valid session ID created as part of the completed handshake procedure and shared with the device, is received via a different secure tunnel or socket. This may occur when an unscrupulous party has intercepted the session identifier despite the steps outlined above, and attempts to use the valid session identifier to purport to communicate via the validated device by communicating using the intercepted valid session ID over a different secure communications channel. Alternatively, this may occur when an authorised user reconnects using a different socket.

In one embodiment, in response to detecting (217) receipt of a valid session ID over a different secure tunnel than the one used to complete the handshake procedure, the server cancels (219) the existing session ID. The server then generates (221) a new session ID using the parameters of the original handshake, and transmits (223) this to the mobile device over the second communications channel (111). The mobile device receives (225) the new session ID. The application operating on the communication device then automatically uses the newly received session ID to communicate (227A, 227B) with the server over the original secure tunnel and over the first communication channel (109). In this manner, the original session may be continued.

In an alternative embodiment, the server may send a new parameter of the handshake procedure over the second communication channel (111) to the device so that a new handshake procedure may be completed. The new component may also be a set of random numbers for generating a new encryption/decryption key for use in the session over the secure tunnel.

Alternatively, a new encryption/decryption key may be sent over the second communications channel (111). This may prevent repeat of the handshake procedure, yet still provide adequate security. The device may then use this parameter or key in communicating with the server.

FIG. 3 illustrates a second embodiment of the described method of operation. In this embodiment, the component of the handshaking procedure that is sent via the second communication channel is a random number for use in establishing the encryption and decryption key.

The communication device (105) transmits (301) a session request to the server (107) over the first communication channel, the Internet (109). The session request is then received (303) by the server.

A secure tunnel is then created between the communication device (105) and the server (107). The tunnel's creation is initiated by a handshaking procedure (305A, 305B), in the present embodiment also a secure sockets layer (SSL) handshake. During the handshake, the server (107) and the communication device (105) agree on a cipher specification.

A component of the handshake procedure, in the present embodiment a random number used for generation of an encryption/decryption key to be used to encrypt and decrypt information during the session, is transmitted (307) to the communication device (105) by the server (107) via a second communication channel (111), for example, in the case of a mobile communication device also in the form of an SMS communication channel.

The random number is received (309) by the mobile communication device over the second communication channel. An application operating on the communication device automatically scans the second communication channel for the random key, and detects (311) the receipt thereof. Once received, the application automatically instructs the communication device to use the random number to generate an encryption/decryption key to encrypt communications with the server during the current session. The server may independently generate the encryption/decryption key using the random number. The handshake procedure may then be completed (313A, 313B) using the encryption/decryption key.

After the handshake procedure has completed and the communication device has been provided with a session ID required for communication, the secure tunnel may be used (315) for further communication between the mobile communication device and the server using the encryption/decryption key.

It should be noted that the server may be configured to automatically detect that a valid session ID has been received via a different secure tunnel than initially used with that session ID. In the present embodiment, the server may be configured to transmit a different random number to the mobile communication device over the second communication channel, with the handshaking procedure updated during which a new session ID is provided to the communication device so that communication between the mobile communication device and the server may continue.

It should be noted that any parameter required to complete a handshake procedure, other than those explained above, may be transmitted to the device via an alternative communications channel. Examples of such components include an SSL version number, cipher settings, randomly generated data, a digital certificate or information from the digital certificate, a piece of data known only be the device and the server, or the like.

In order for the server to communicate with a user device over a second communication channel, the server may be in possession of an identifier or address of the user or their device which allows the server to contact them over the second communication channel. This may be, for example, a mobile phone number, an international mobile subscriber identity (IMSI) number, an international mobile station equipment identity (IMEI) number, an email address, or the like. The identifier may allow the server to contact the device over the applicable second communications channel. The server may have a database associated therewith which may contain such an identifier or address associated with a parameter of the user received during communication with the server, possibly a parameter inherent in the first communication channel. By looking up and matching the parameter with the identifier or address, communication over the second communication channel may be facilitated. In the embodiment described above with reference to FIG. 2B, the session ID received over the different tunnel may be used to identify the user and extract the identifier required to contact the user over the second communication channel.

Figure 4:
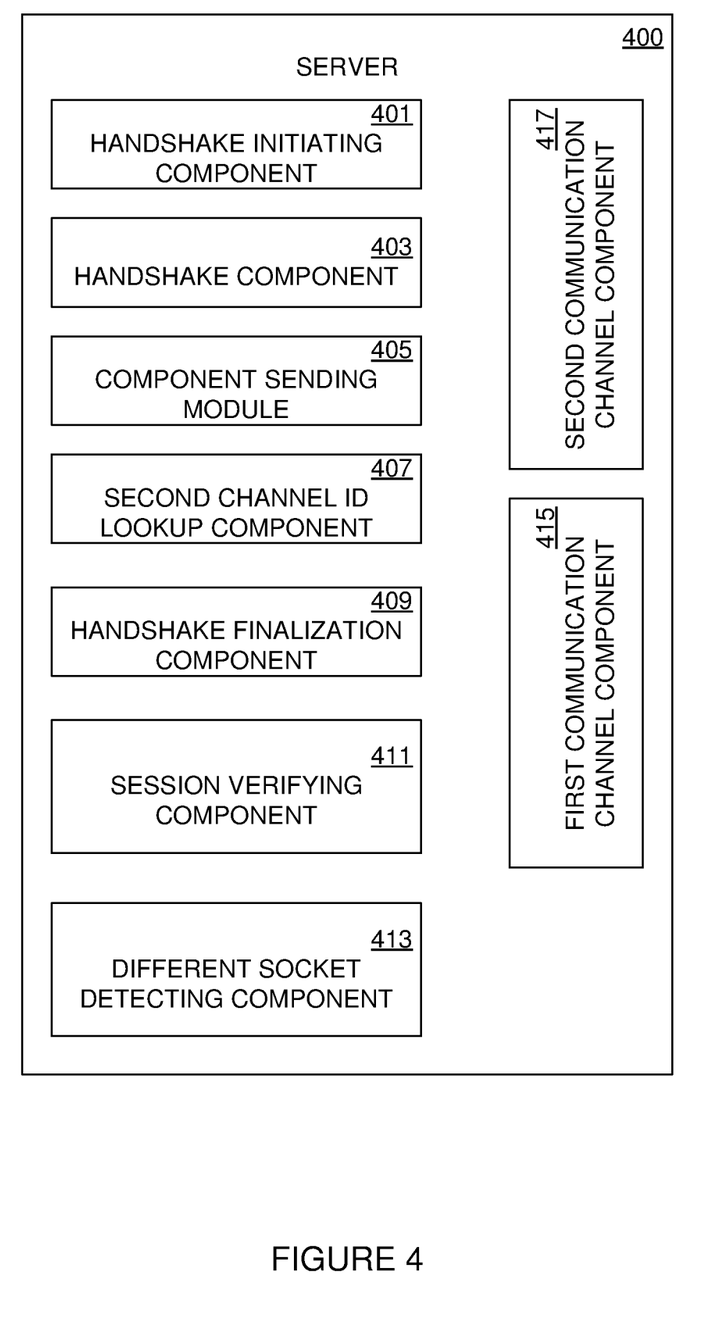
FIG. 4 is a block diagram of an example embodiment of a server according to an aspect of the present invention.

FIG. 4 shows an example embodiment of a server (400) for use in the described system. Components providing the functionality of the described method are provided as computer-readable instructions provided in memory and executable by a processor of the server. The server includes a handshake initiating component (401), a handshake component (403), a component sending module (405), a second channel identifier lookup component (407), a handshake finalization component (409), a session verifying component (411), a different socket detecting component (413), a first communication channel component (415) and a second communication channel component (417).

The handshake initiating component (401) may be used to initiate a handshake procedure with a device in response to receiving a session request from the device. The handshake component (403) may be used to carry out a handshake procedure to set up an encryption/decryption key for a secure tunnel wherein the hand shake procedure uses a first communication channel component (415) from the server to the device.

The component sending module (405) may be used to transmit a component of the handshake procedure to the device via the second communication channel component (417). In order to determine to which address the component should be transmitted to, the second channel identifier lookup component (407) may be used to obtain an identifier or the address of the user. This may be looked up in a database associated with the server. The handshake finalization component (409) may then be used to finalize the handshake procedure.

The session verifying component (411) may detect that a valid session is in progress between the server and the device. The different socket detecting component (413) may be configured to automatically detect if the component of the handshake procedure is received via a different secure tunnel.

During use of a valid session ID, an unscrupulous party may intercept this valid session ID and attempt to communicate with the server whilst purporting to be an authorized user and/or user device to which the valid session ID was communicated initially. Systems may only be configured to check for a valid session ID, and not monitor whether a separate connection via a separate secure tunnel is used in combination with the valid session ID. However, by monitoring the channel in use, the present system may prevent a valid session ID from being used by an unscrupulous party. As soon as a separate channel is used with an existing valid session ID, the different socket detecting component (413) communicates this fact to the server, which in turn re-initiates the handshake procedure with the device via the handshake component (401), or sends an alternative parameter to the device to use in further communications. This parameter may be a new encryption/decryption key, a new session ID, or the like, and is send via the component sending module (405). Transmission may be facilitated by the second communication channel component (417).

It is envisaged that the session ID may be encrypted when transmitted over the second communication channel. The handshake finalization component (409) may then be employed to continue and compete the re-initiated handshake procedure.

Figure 5:
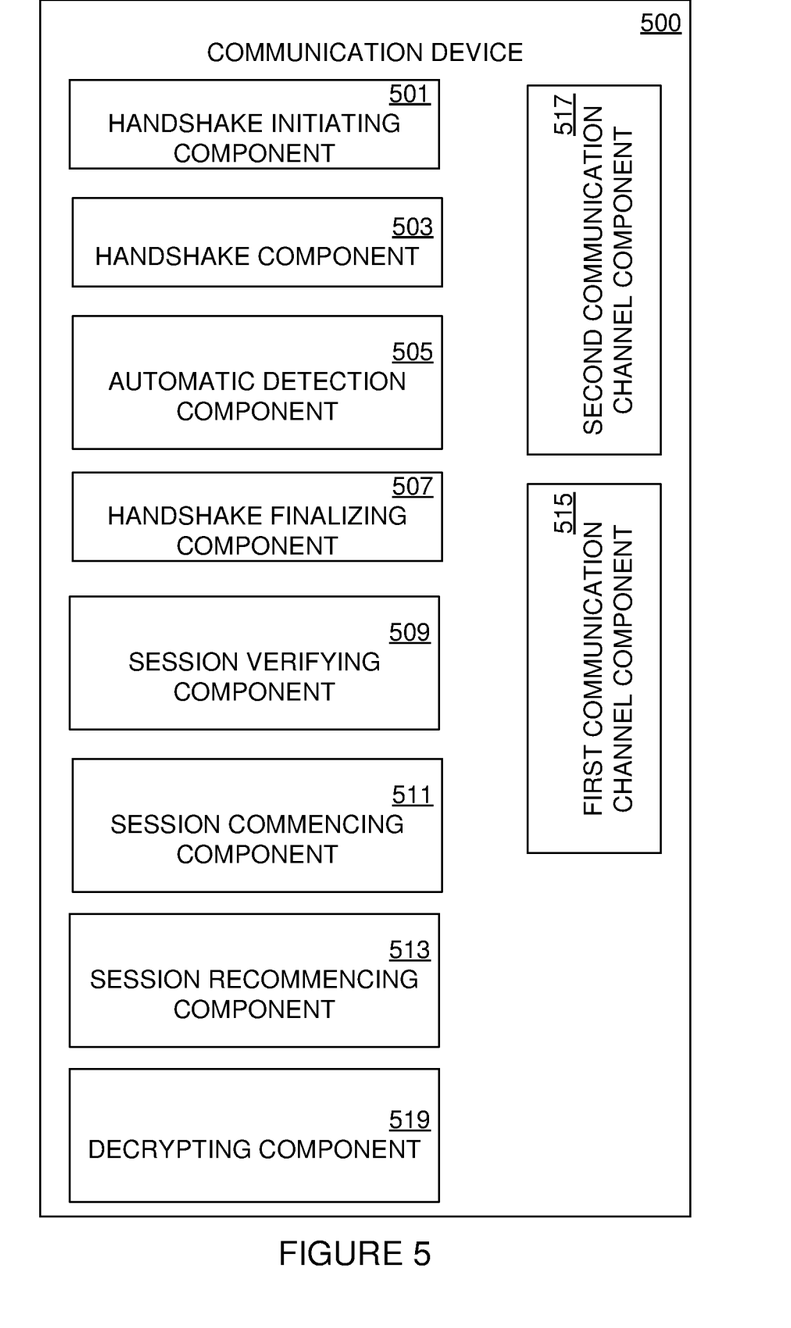
FIG. 5 is a block diagram of an example embodiment of a device according to an aspect of the present invention.

FIG. 5 shows a communication device having the components required for the described functionality. Components may be computer-readable instructions provided in memory and executable by a processor of the communication device. The device includes a handshake initiating component (501), a handshake component (503), an automatic detection component (505), a handshake finalization component (507), a session verifying component (509), a session commencing component (511), a session recommencing component (513), a first communication channel component (515), a second communication channel component (517), and a decrypting component (519).

The handshake initiating component (501) may be used to initiate a handshake procedure with a server, typically by transmitting a session request to the server via the first communication channel component (515). The handshake component (503) may be configured to carry out a handshake procedure to set up an encryption/decryption key for the secure tunnel wherein the handshake procedure uses a first communication channel from the server to the device. At least some components required for the handshake procedure may be received via the first communication channel component (515).

The automatic detection component (505) may automatically detect an incoming component of the handshake procedure via the second communication channel component (515). The handshake finalization component may use the component received via the second communication channel for finalizing the handshake procedure. This may include generating a premaster or the encryption/decryption key for the secure tunnel. Alternatively, the session commencing component (511) may be used to commence use of the secure tunnel established by the handshake procedure using the component of the handshake procedure received via the second communication channel.

The session commencing component (511) may provide the component received via the second communication channel to the server to start or to recommence a session with the server.

The session verifying component (509) detects that a valid session is underway in which the details obtained via the handshaking procedure, i.e. at least a session ID, is underway. If the automatic detection component (505) detects that a new component of the handshake procedure has been received by via the second communication channel component (515), the handshake finalization component (507) may finalize a new handshake, with a new session ID.

The session recommencing component (513) may then recommence use of the session with the updated session ID. This may include receiving a new component of the handshake procedure via the second communication channel, and carrying out a new handshake procedure or commencing use of the session using the new component.

The decrypting component (517) may be configured to decrypt the component using a decryption key provided by the server during the handshake procedure, or at a registration process.

It should be noted that any suitable device may be used in communicating with the server, and not necessarily a mobile device or mobile phone as was used in embodiments above. Using a device which utilizes an SMS channel as a second communications channel may prevent certain equipment such as laptop computers from being used to emulate the relevant mobile device. Alternative devices may include a personal computer, a laptop computer or the like. Any suitable client device may be used as long as a separate communication channel is available which may be monitored for automatic extraction of the session ID or encryption/decryption key necessary to commence use of the secure tunnel and/or secure communications between the server and client device.

It should be noted that devices may need to be authorized in order to use the system. This may require a registration process, whereby a specific device is registered for use of the system and method. This may involve the device and a suitable identifier or address to be placed on the database associated with the server. During communication over the first communication channel, the server may then look up the identifier or address in order to contact the device over the second communication channel. Upon registration, an encryption key may be provided to the device with which communication with the server may be encrypted or decrypted. This may include encryption of the component sent via the second communication channel. It should, however, be noted that encryption of the component may be performed with a key received during initial handshake communication with the server and over the first communication channel. It may therefore be the public key of the server which is provided as part of the digital certificate of the server.

Figure 6:
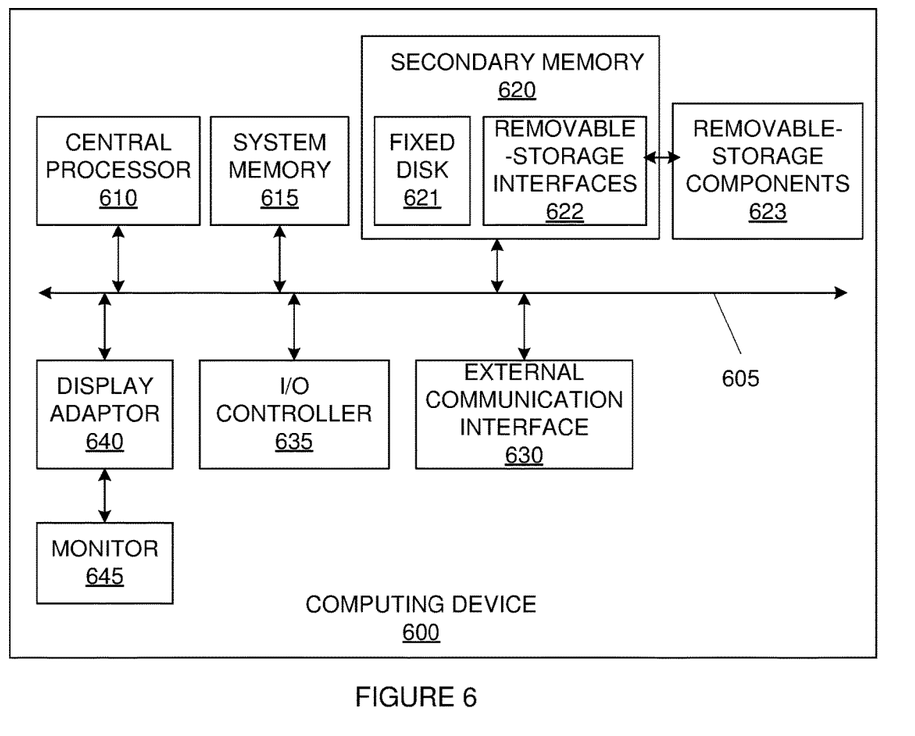
FIG. 6 is a block diagram of an example of a computing device in which various aspects of the disclosure may be implemented; and, FIG. 7 is a block diagram of a communication device that may be used in embodiments of the disclosure.

FIG. 6 illustrates an example of a computing device (600) in which various aspects of the disclosure may be implemented, such as the server (107) or the communication device (105). The computing device (600) may be suitable for storing and executing computer program code. The various participants and elements in the previously described system diagrams may use any suitable number of subsystems or components of the computing device (600) to facilitate the functions described herein.

The computing device (600) may include subsystems or components interconnected via a communication infrastructure (605) (for example, a communications bus, a cross-over bar device, or a network). The computing device (600) may include at least one central processor (610) and at least one memory component in the form of computer-readable media.

The memory components may include system memory (615), which may include read only memory (ROM) and random access memory (RAM). A basic input/output system (BIOS) may be stored in ROM. System software may be stored in the system memory (615) including operating system software.

The memory components may also include secondary memory (620). The secondary memory (620) may include a fixed disk (621), such as a hard disk drive, and, optionally, one or more removable-storage interfaces (622) for removable-storage components (623).

The removable-storage interfaces (622) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (622) may also be in the form of ports or sockets for interfacing with other forms of removable-storage components (623) such as a flash memory drive, external hard drive, or removable memory chip, etc.

The computing device (600) may include an external communications interface (630) for operation of the computing device (600) in a networked environment enabling transfer of data between multiple computing devices (600). Data transferred via the external communications interface (630) may be in the form of signals, which may be electronic, electromagnetic, optical, radio, or other types of signal.

The external communications interface (630) may enable communication of data between the computing device (600) and other computing devices including servers and external storage facilities. Web services may be accessible by the computing device (600) via the communications interface (630).

The external communications interface (630) may also enable other forms of communication to and from the computing device (600) including, voice communication, near field communication, Bluetooth™, etc.

The computer-readable media in the form of the various memory components may provide storage of computer-executable instructions, data structures, program modules, and other data. A computer program product may be provided by a computer-readable medium having stored computer-readable program code executable by the central processor (610). A computer program product may be provided by a non-transient computer-readable medium, or may be provided via a signal or other transient means via the communications interface (630).

Interconnection via the communication infrastructure (605) allows a central processor (610) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (600) either directly or via an I/O controller (635). These components may be connected to the computing device (600) by any number of means known in the art, such as a serial port. One or more monitors (645) may be coupled via a display or video adapter (640) to the computing device (600).

Figure 7:
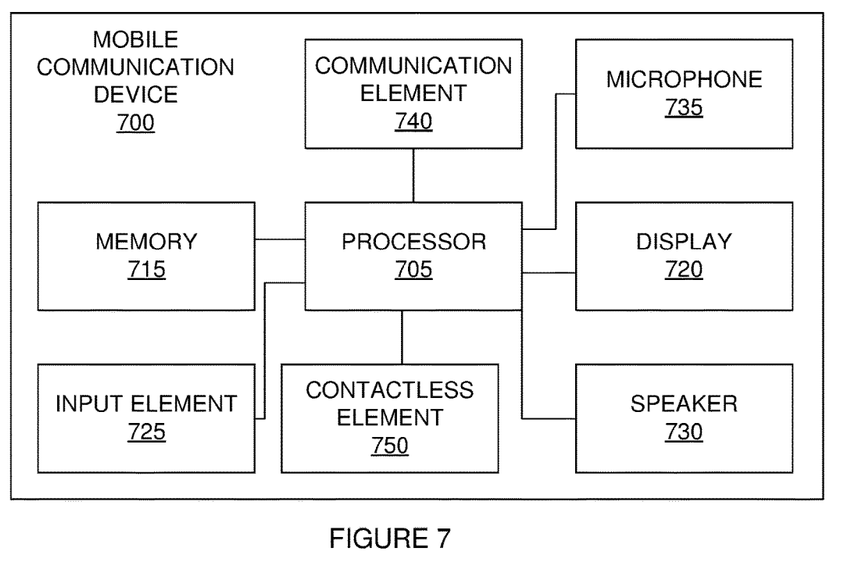

FIG. 7 shows a block diagram of a mobile communication device (700) that may be used in embodiments of the disclosure, such as for the communication device (105). The mobile communication device (700) may be a cell phone, a feature phone, a smart phone, a satellite phone, or a computing device having a phone capability.

The mobile communication device (700) may include a processor (705) (e.g., a microprocessor) for processing the functions of the mobile communication device (700) and a display (720) to allow a user to see the phone numbers and other information and messages. The mobile communication device (700) may further include an input element (725) to allow a user to input information into the device (e.g., input buttons, touch screen, etc.), a speaker (730) to allow the user to hear voice communication, music, etc., and a microphone (735) to allow the user to transmit his or her voice through the mobile communication device (700).

The processor (710) of the mobile communication device (700) may connect to a memory (715). The memory (715) may be in the form of a computer-readable medium that stores data and, optionally, computer-executable instructions.

The mobile communication device (700) may also include a communication element (740) for connection to communication channels (e.g., a cellular telephone network, data transmission network, Wi-Fi™ network, satellite-phone network, Internet network, Satellite Internet Network, etc.). The communication element (740) may include an associated wireless transfer element, such as an antenna.

The communication element (740) may include a subscriber identity module (SIM) in the form of an integrated circuit that stores an international mobile subscriber identity and the related key used to identify and authenticate a subscriber using the mobile communication device (700). One or more subscriber identity modules may be removable from the mobile communication device (700) or embedded in the mobile communication device (700).

The mobile communication device (700) may further include a contactless element (750), which is typically implemented in the form of a semiconductor chip (or other data storage element) with an associated wireless transfer element, such as an antenna. The contactless element (750) may be associated with (e.g., embedded within) the mobile communication device (700) and data or control instructions transmitted via a cellular network may be applied to the contactless element (750) by means of a contactless element interface (not shown). The contactless element interface may function to permit the exchange of data and/or control instructions between mobile device circuitry (and hence the cellular network) and the contactless element (750).

The contactless element (750) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth™, infra-red, or other data transfer capability that can be used to exchange data between the mobile communication device (700) and an interrogation device. Thus, the mobile communication device (700) may be capable of communicating and transferring data and/or control instructions via both a cellular network and near field communications capability.

The data stored in the memory (715) may include: operation data relating to the operation of the mobile communication device (700), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the mobile communication device (700) to selected receivers.

The mobile communication device (700) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

It should be appreciated that components or modules described herein may have the required configuration and/or arrangement of hardware, software, firmware or the like for performing their associated functions, steps, processes and/or operations. The software components or functions described in this application may be implemented as software code to be executed by one or more processors using any suitable computer language such as, for example, Java™, C++, or Perl™ using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer-implemented method for establishing a secure communication tunnel between a device and a server, wherein the method is carried out at the server having a processor and a memory configured to provide instructions to the processor and the method comprises:
receiving a session request from the device to establish a secure tunnel;
carrying out a handshake procedure to set up an encryption/decryption key for the secure tunnel wherein the handshake procedure uses a first communication channel from the server to the device;
sending a first component of the handshake procedure to the device via the first communication channel; and
sending a second component of the handshake procedure to the device via a second communication channel,
wherein continuing the handshake procedure or commencing use of the secure tunnel established by the handshake procedure comprises use, by the device, of the second component sent to the device via the second communication channel.

2. The method as claimed in claim 1, further comprising looking up an address or identifier relating to the second communication channel of the device prior to sending the second component of the handshake procedure via the second communication channel.

3. The method as claimed in claim 1, wherein the second component is a component for the handshake procedure and continuing the handshake procedure comprises use of the second component by the device to generate a premaster key or the encryption/decryption key for the secure tunnel.

4. The method as claimed in claim 3, wherein the second component is one of a group of: a version of a communication protocol used; a cipher version; a set of random data used for a session encryption key; a public key of the server; and a certificate of the server.

5. The method as claimed in claim 1, wherein the second component is a component for a session using the secure tunnel, and wherein commencing use of the secure tunnel comprises use of the second component by the device to start or recommence a session with the server.

6. The method as claimed in claim 5, wherein the second component is a session identifier which references session parameters at the server.

7. The method as claimed in claim 1, including, in response to detecting receipt of a session identifier from a different socket, sending a new component of the handshake procedure to the device via the second communication channel; and carrying out a new handshake procedure or commencing use of a session using the second component.

8. The method as claimed in claim 7, wherein the new component for commencing use of the session is a new set of random numbers for generating a new session encryption/decryption key for the secure tunnel under the existing handshake.

9. The method as claimed in claim 1, wherein the second component is encrypted with an encryption key.

10. The method as claimed in claim 1, wherein the first communication channel is a data channel using Transport Layer Security (TLS) or Secure Sockets Layer (SSL) protocol, and the second communication channel is one of a group of: a Short Message Service channel, Unstructured Supplementary Service Data (USSD) channel, an email channel, or another form of communication channel independent of the TLS or SSL channel.

11. The method according to claim 1, further comprising in response to receiving the first component and the second component of the handshake procedure, authenticating the server.

12. A computer-implemented method for establishing a secure communication tunnel between a device and a server, wherein the method is carried out at the device having a processor and a memory configured to provide instructions to the processor and the method comprises:
    sending a session request to the server to establish a secure tunnel;
    carrying out a handshake procedure to set up an encryption/decryption key for the secure tunnel wherein the handshake procedure uses a first communication channel from the server to the device;
    receiving a first component of the handshake procedure via the first communication channel;
    receiving a second component of the handshake procedure via a second communication channel; and
    automatically detecting the receipt of the second component at the second communication channel and using this component to continue the handshake procedure or to commence use of the secure tunnel established by the handshake procedure.

13. The method as claimed in claim 12, wherein the second component is a component for the handshake procedure and continuing the handshake procedure includes:
    using the second component to generate a premaster key or the encryption/decryption key for the secure tunnel.

14. The method as claimed in claim 12, wherein the second component is a component for a session using the secure tunnel, and wherein commencing use of the secure tunnel includes:
    providing the second component to the server to start or recommence a session with the server.

15. The method as claimed in claim 12, in response to using a session identifier from a different socket, receiving a new component of the handshake procedure via the second communication channel; and carrying out a new handshake procedure or commencing use of a session using the new component.

16. The method as claimed in claim 15, wherein the new component for commencing use of the session is a new set of random numbers for generating a new session encryption/decryption key for the secure tunnel under the existing handshake.

17. The method as claimed in claim 12, wherein the sent component is encrypted with an encryption key, and the method includes:
    decrypting the sent component using a decryption key provided by the server during the handshake procedure or at a registration process.

18. A system for establishing a secure communication tunnel comprising a server having a processor and a memory configured to provide instructions to the processor for carrying out functions of server components, the server including:
    a handshake initiating component for initiating a handshake procedure with a device in response to receiving a session request from the device;
    a handshake component for carrying out a handshake procedure to set up an encryption/decryption key for the secure communication tunnel wherein the handshake procedure uses a first communication channel from the server to the device;
    a first component sending module for transmitting a first component of the handshake procedure to the device via the first communication channel; and
    a second component sending module for transmitting a second component of the handshake procedure to the device via a second communication channel,
    wherein continuing the handshake procedure or commencing use of the secure communication tunnel established by the handshake procedure comprises use of the second component by the device.

19. The system as claimed in claim 18, including a second channel identifier lookup component for, in response to receiving a session request over the first communication channel, looking up an identifier or address associated with the device.

20. The system as claimed in claim 18, including a different socket detecting component for detecting when a valid session identifier is received via a different socket.

21. A system for establishing a secure communication tunnel comprising a device having a processor and a memory configured to provide instructions to the processor for carrying out functions of device components, the device including:
    a handshake initiating component for initiating a handshake procedure with a server by transmitting a session request to the server to establish a secure tunnel;
    a handshake component for carrying out a handshake procedure to set up an encryption/decryption key for the secure tunnel wherein the handshake procedure uses a first communication channel from the server to the device;
    a first automatic detection component for automatically detecting a first component of the handshake procedure received via the first communication channel;
    a second automatic detection component for automatically detecting a second component of the handshake procedure received via a second communication channel; and
    a handshake finalizing component for finalizing the handshake procedure using the component of the handshake procedure received via the second communication channel or a session commencing component for commencing use of the secure tunnel established by the handshake procedure using the component of the handshake procedure received via the second communication channel.

* * * * *

UNITED STATES PATENT AND TRADEMARK OFFICE
CERTIFICATE OF CORRECTION

PATENT NO. : 10,404,475 B2
APPLICATION NO. : 15/525896
DATED : September 3, 2019
INVENTOR(S) : Alan Joseph O'Regan and Horatio Huxham Page 1 of 1

It is certified that error appears in the above-identified patent and that said Letters Patent is hereby corrected as shown below:

In the Claims

Column 18, Claim 17, Line 9, please remove "The method as claimed in claim 12, wherein the sent component" and insert -- The method as claimed in claim 12, wherein the second component --

Column 18, Claim 17, Line 12, please remove "decrypting the sent component" and insert -- decrypting the second component --

Column 18, Claim 18, Line 23, please remove "carrying out a handshake" and insert -- carrying out the handshake --

Column 18, Claim 21, Line 67, please remove "procedure using the component" and insert -- procedure using the second component --

Column 19, Claim 21, Line 4, please remove "procedure using the component" and insert -- procedure using the second component --

Signed and Sealed this
Tenth Day of March, 2020

Andrei Iancu
*Director of the United States Patent and Trademark Office*